United States Patent Office 2,802,868
Patented Aug. 13, 1957

2,802,868

COMPLEX FORMING AMINO ACETIC ACIDS

Hans Schläpfer, Basel, and Jakob Bindler, Riehen, near Basel, Switzerland, assignors to J. R. Geigy A.-G., Basel, Switzerland No Drawing. Application October 27, 1955,
Serial No. 543,262

Claims priority, application Switzerland
November 12, 1954

7 Claims. (Cl. 260—514)

The present invention concerns complex forming amino acetic acids, their production, their use for the binding of undesirable metal ions and their conversion into complex metal compounds which are distinguished from similar known compounds by the increased stability of the complexes.

It has been found that amino acetic acids of the general Formula I possess valuable complex forming properties:

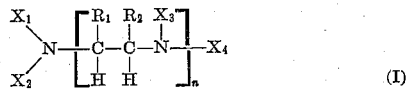

In this formula, of $X_1$, $X_2$, $X_3$ and $X_4$, at least one X represents a 2-hydroxycyclohexyl radical, at least one and preferably two further X each represent the acetic acid radical —$CH_2$—COOH, the other X represent(s) a 2-hydroxy-cyclohexyl radical, an acetic acid radical

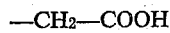

a low molecular alkyl or hydroxyalkyl group or possibly also hydrogen, $R_1$ and $R_2$ represent hydrogen or low molecular aliphatic radicals or, also, together represent a 1.4-alkylene radical, and $n$ represents a whole number of the value of 0 to 3 and preferably of 1 or 2.

The new complex forming amino acetic acids are obtained from amino compounds of the general Formula I wherein of $X_1$ to $X_4$ at least one X represents a 2-hydroxycyclohexyl radical, at least one and preferably two further X represent hydrogen and the other X represent(s) a 2 hydroxycyclohexyl radical, hydrogen or a low molecular alkyl or hydroxyalkyl radical and, possibly also an acetic acid radical, by reacting with compounds introducing the acetic acid radical —$CH_2$—COOH. Here also the symbol $n$ represents a whole number from 0 to 3 and preferably 1 or 2, and the other symbols have the meanings given above. Monohalogen acetic acids such as monochloracetic acid or monobromoacetic acid, the salts, esters and nitriles thereof and also formaldehyde cyanohydrin or mixtures of alkali cyanides and formaldehyde are used as compounds which introduce the acetic acid radical. Advantageously the amount of these used is adapted to the number of hydrogen atoms bound to basic nitrogen atoms.

Examples of amino compounds usable according to the present invention which contain a 2-hydroxycyclohexyl radical are 2-hydroxycyclohexylamine, bis(2-hydroxycyclohexyl)-amine, preferably however, the reaction products of compounds introducing the 2-hydroxycyclohexyl radical with 1.2-diaminoalkanes, 1.2-diaminocycloalkanes, diethylene triamines, triethylene tetramines, 2'-aminoalkyl - 1.2 - diaminocycloalkanes and derivatives thereof which are substituted at single nitrogen atoms by low molecular alkyl and hydroxyalkyl radicals or possibly also acetic acid radicals; further, the reaction products of these compounds introducing the 2-hydroxycyclohexyl radical with partly acylated polyamines of the type listed after saponification of the acylamino groups. For example, reaction products of 1-halogen-2-hydroxycyclohexane or of cyclohexane-1.2-epoxide can be reacted with ethylene diamine, 1.2-propylene diamine, 1.2- or 2.3-butylene diamine, with diethylene triamine, triethylene tetramine, with monoacetyl derivatives of these compounds after saponification, with N-monoalkyl- or N-monohydroxyalkyl derivatives of these compounds. Both homogeneous compounds as well as technical mixtures of these reaction products can be used as starting materials in the process according to the present invention.

Also the new complex forming 2-hydroxycyclohexyl compounds can be produced starting from amino acetic acids of the general Formula I wherein of $X_1$ to $X_4$ at least one X and preferably two or more represent the acetic acid radical —$CH_2$—COOH and at least one further X represents hydrogen and the other X can also possibly represent a low molecular alkyl or hydroxyalkyl group, and $n$, $R_1$ and $R_2$ have the meanings given above, by reaction with compounds introducing the 2-hydroxycyclohexyl radical. As such can be used, as above, 1-chloro- or 1-bromo-2-hydroxy-cyclohexane or cyclohexane-1.2-epoxides. Examples of amino acetic acids which correspond to Formula I are iminodiacetic acid, the N.N'-diacetic acids of ethylene diamine, of 1.2-propylene diamine, of 1.2- or 2.3-butylene diamine, or 1.2-diaminocyclohexane, the N.N''-diacetic acids of bis-aminoethyl-methyl-, ethyl- or hydroxyethyl-amine, diethylene triamine-N.N'.N''-triacetic acid, ethylene diamine-N.N-diacetic acid, N'-methyl-, -ethyl- or hydroxyethyl-ethylene diamine-N.N-diacetic acid or N-methyl-, -ethyl- or -hydroxyethyl-ethylene diamine-N.N'-diacetic acid and compounds of a similar structure.

The new amino acetic acids containing the 2-hydroxycyclohexyl radical of the general Formula I are compounds which dissolve well as such as well as in the form of their alkali salts in water. They are capable of binding co-ordinative polyvalent metal ions such as earth alkali and heavy metal ions, in particular those from the group of iron metals, well. They can be converted with iron salts into complex iron compounds which are distinguished by the good stability of the complexes at higher pH values of, for example, 8 to 11. They can be used, therefore, for the improvement of alkaline earth which is poor in iron and, in certain conditions, are still effective when other agents which up to now have been used for this purpose, e. g. diphenylene diamine tetra-acetic acid, are no longer so.

The following examples illustrate the invention without limiting it in any way. The parts are given as parts by weight and the temperatures are in degrees centigrade.

Example 1

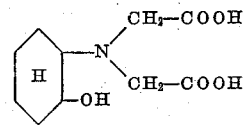

100 parts of monochloracetic acid are dissolved in 250 parts of water and neutralised while cooling with ice at a temperature of at most 10° with 131 parts of 32% caustic soda lye. 57.5 parts of 2-aminocyclohexanol are added while stirring to this solution and the whole is heated to 70–75° in a water bath. The reaction solution is kept continually phenolphthalein alkaline by the slow addition of 131 parts of 32% caustic soda lye. On completion of the addition, the solution which is alkaline to mimosa paper, is heated for 5 hours at 90–95°, cooled to 35° and while stirring, 128 parts of 30% hydrochloric acid are added. After a short time, the N-(2-hydroxycyclohexyl)-iminodiacetic acid crystallises out. 75 parts (65% of the theoretical) of practically pure acid are obtained which, after recrystallisation from water, melt at 147–149°.

Example 2

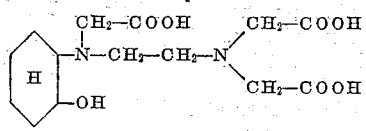

420 parts of 30% caustic soda lye are added dropwise while cooling with ice to a solution of 300 parts of monochloracetic acid in 700 parts of water. After the addition of 158 parts of N-(2-hydroxy-cyclohexyl)-ethylene diamine, the whole is stirred and heated to 70–75° and at the same time, 420 parts of 30% caustic soda lye are added dropwise in such a way that the reaction is always phenolphthalein alkaline. To complete the reaction, the components are stirred at 90–95° for 4 hours. After 383 parts of 30% hydrochloric acid have been added, the solution is concentrated whereupon the N-(2-hydroxy-cyclohexyl)-ethylene diamine-N.N′.N′-triacetic acid formed slowly precipitates. The pure compound is obtained in fine crystals which melt at 197–199° by recrystallisation from water.

The compound obtained has a high tendency to form complex salts which are very stable and easily soluble.

If in this example, 172 parts of N-(2-hydroxy-5-methyl-cyclohexyl)-ethylene diamine are used instead of 158 parts of N-(2-hydroxy-cyclohexyl)-ethylene diamine and otherwise the same procedure is followed, then N-(2-hydroxy-5-methyl-cyclohexyl)-ethlyene diamine-N.N′.N′-triacetic acid is obtained which has the same good complex forming powers.

Example 3

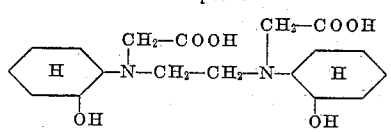

82 parts of dihydrochloride of N.N′-bis-(2-hydroxycyclohexyl)-ethylene diamine (prepared from so-called inactive diamine, M. P. 203–204°) are suspended in a mixture of 290 parts of water and 240 parts of 95% alcohol and the whole is cooled while stirring to 5°. After adding 44.4 parts of 37.3% formaldehyde, a solution of 26.8 parts of 95.1% sodium cyanide in 80 parts of water is added within 2 minutes whereupon the temperature rises to about 13°. The suspension is then brought to 60–65° within 15 minutes after which a solution gradually forms. The solution is stirred for 5 minutes at this temperature, then cooled to 10–15°, the cloudy solution is diluted with 240 parts of water and the dinitrile is shaken out with 250 parts of chloroform. By evaporating the chloroform at 55° at the most, 82–85 parts of crude dinitrile are obtained as a pale viscous oil.

To saponify the dinitrile, it is stirred with 700 parts of 37.3% hydrochloric acid at 0–5° for 10 hours and then for 18–20 hours at room temperature. It is then diluted with 700 parts of water and stirred for 5 hours at 90–95°. After cooling, the precipitated dihydrochloride of N.N′-bis-(2-hydroxyclclohexyl)-ethylene diamine-N.N′-diacetic acid is isolated, washed with 7.5% hydrochloric acid and dried. 76–80 parts of the dihydrochloride are obtained.

To convert into the free diacetic acid, 80 parts of the dihydrochloride are pasted in 320 parts of water and the pH value is adjusted to 4 in the warm with caustic soda lye. After standing for a considerable time (more quickly on insertion of a few seed crystals), the diacetic acid crystallises in fine needles which melt at 164–165°. The yield is 66% of the theoretical.

If, instead of the so-called inactive form, the so-called d.l-form which melts at 125–126° is used, then by working in a similar manner, a good yield of the monolactone of N.N′-bis-(2-hydroxycyclohexyl)-ethylene diamine-N.N′-diacetic acid is obtained.

The compounds obtained according to this example form stable complex salts which are easily soluble. They are capable of forming easily soluble and colourless complex iron salts in an alkaline pH range.

If, in the above process, N.N′-bis-(2-hydroxy-5-methyl-cyclohexyl)-ethylene diamine is used instead of N.N′-bis-(2-hydroxy-cyclohexyl)-ethylene diamine, then N.N′-bis - (2 - hydroxy-5-methyl-cyclohexyl)-ethylene diamine-N.N′-diacetic acid is obtained. It has similar properties.

Example 4

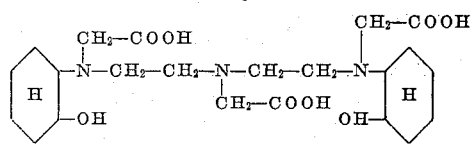

61 parts of the trihydrochloride of N.N″-bis-(2-hydroxycyclohexyl)-diethylene triamine (M. P. 230–231° on decomposition) are dissolved in 180 parts of water and the temperature is reduced to 5°. A solution of 24 parts of 95.1% sodium cyanide in 90 parts of water is added dropwise while stirring at 5–8° and then 41 parts of 37.3% formaldehyde are added within 1½ minutes whereupon the inner temperature rises from 5° to 22°. The reaction mixture becomes cloudy during the formaldehyde addition and the trinitrile separates as a smeary mass. After stirring at 12–15° for 15 minutes, the trinitrile is taken up in 150 parts of chloroform, separated and the solvent is evaporated off in the vacuum at a temperature of at most 55°. The residue is saponified with 500 parts of 37.3% hydrochloric acid as described in Example 3 and, after evaporating off the hydrochloric acid, is worked up to form the sodium salt. 350 parts of a solution of the sodium salt of N.N″-bis-(2-hydroxycyclohexyl)-diethylene triamine-N.N′.N″-triacetic acid are obtained. The content determined titrimetrically of complex forming triacetic acid is 14.5% which corresponds to a yield of 71.5% of the theoretical.

The solution obtained forms complexes well with earth alkali and heavy metal ions, in particular with those from the group of iron metals.

If in the above example 77 parts of the tetrahydrochloride of N.N‴-bis-(2-hydroxycyclohexyl)-triethylene tetramine are used instead of the trihydrochloride of N.N″-bis-(2-hydroxycyclohexyl)-diethylene triamine and otherwise the same procedure is followed as in Example 4, then a very strong complex forming solution is also obtained.

Example 5

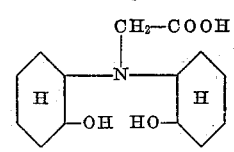

44.7 parts of so-called inactive bis-(2-hydroxycyclohexyl)-amine (M. P. 153°) are dissolved at 60° in a mixture of 150 parts of water and 150 parts of 95% alcohol. 25.6 parts of 30% hydrochloric acid are added dropwise while stirring and the solution of the chlorohydrate obtained is cooled to 5–10°. 22 parts of 37.3% formaldehyde and then a solution of 11.1 parts of 95.1% sodium cyanide in 40 parts of water are added to the suspension and the whole is heated to 30–35° whereupon a clear solution is quickly obtained. The solution is stirred for 10 minutes at this temperature, cooled to 10–12° and 40 parts of water are added. After some time the nitrile separates in crystalline form from the milky dispersion. After stirring for 1½ hours at about 12°, the product is drawn off under suction, washed free of salt with ice water and dried in the vacuum at 30–40°. Yield is about 48 parts of crude nitrile.

The crude nitrile is saponified with 10 times the amount of 37.3% hydrochloric acid as described in Example 3 and the hydrochloric acid is evaporated off from the saponification solution in the vacuum. The evaporation residue is dissolved in water, caustic soda lye is added until mimosa paper turns brown and the solution is evaporated until it becomes cloudy. The solution is filtered over active charcoal. On standing, the sodium salt of bis-(2-hydroxycyclohexyl)-aminoacetic acid precipitates in the form of lamellar crystals which contain crystal water. The sodium salt can be purified by recrystallisation from a little diluted caustic soda lye.

If the so-called d.l-form of bis-(2-hydroxycyclohexyl)-amine (M. P. 115–117°) is used and similar procedure is followed, the isomeric bis-(2-hyroxycyclohexyl)-aminoacetic acid is obtained which melts at 184–185°.

In an alkaline pH range the bis-(2-hydroxycyclohexyl)-aminoacetic acids are capable of forming stable and easily soluble complex salts, in particular with iron ions.

If in this example instead of the inactive bis-(2-hydroxycyclohexyl)-amine, the N-2-hydroxycyclohexyl-N.β-hydroxyethylamine which is obtained from 1.2-chlorohydroxy-cyclohexane with monoethanolamine is used and the procedure described above is followed, then N.β-hydroxyethyl-N-2-hydroxycyclohexylamino-N-acetic acid is obtained which has also good powers of complex formation with iron ions.

*Example 6*

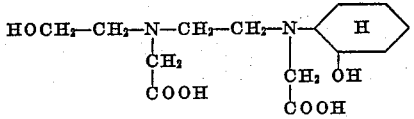

84 parts of caustic soda lye 30% are slowly added dropwise within 45 minutes at 70–75° to a solution of 60.6 parts of N-(hydroxyethyl)-N′-(2-hydroxycyclohexyl)-ethylene diamine and 73.5 parts of the sodium salt of monochloroacetic acid in 220 parts of water. The mixture is then warmed to 90–95° and stirred at this temperature for 4 to 5 hours. In this manner a solution of the sodium salt of N-(hydroxyethyl)-N′-(2-hydroxycyclohexyl)-ethylene diamine-N.N′-diacetic acid is obtained. This solution can be used as such. The sodium salt can be isolated by evaporating the solution.

*Example 7*

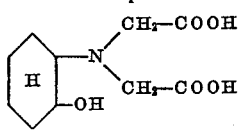

66.7 parts of iminodiacetic acid are dissolved in 200 parts of water with the addition of 40 parts of caustic soda. 50 parts of 1.2-cyclohexene oxide are added to the alkaline solution and the reaction mixture is heated while stirring strongly to 80–85°. After about 2 hours a practically clear reaction solution is obtained. Stirring is continued for 5 hours to complete the reaction. The solution is then made up to 600 parts with water, 122 parts of 30% hydrochloric acid are added and the whole is left to stand. After a short time, the N-(2-hydroxycyclohexyl)-iminodiacetic acid begins to crystallise out. 76 parts are obtained (M. P. 147–149°). The product is identical to that obtained according to Example 1.

*Example 8*

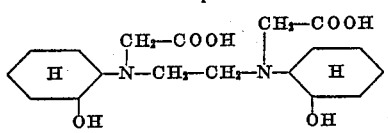

52.8 parts of ethylene diamine-N.N′-diacetic acid are dissolved in 200 parts of water with the addition of 24 parts of caustic soda to form the disodium salt. After adding 60 parts of 1.2-cyclohexene oxide, the whole is heated under reflux at 75–80° while stirring strongly. After about 2½ to 3 hours, the greater part of the epoxide has reacted. It is stirred for a further 5 hours. The solution obtained, which forms complexes well with earth alkali as well as Fe ions, contains 22.1% of the isomeric N.N′-bis-(2-hydroxycyclohexyl)-ethylene diamine-N.N′-diacetic acids. This corresponds to a yield of 66.5% of the theoretical.

The mixture can be split for example by separating the dihydrochloride of the diacetic acid obtained according to Example 3 by adding hydrochloric acid and the isomeric diacetic acid or the monolactone thereof is isolated from the remaining solution.

*Example 9*

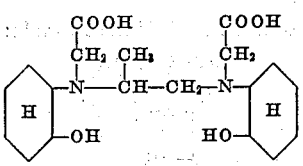

60 parts of 1.2-cyclohexene oxide are added to a solution of 57 parts of 1.2-propylene diamine-N.N′-diacetic acid and 24 parts of caustic soda dissolved in 220 parts of water and the whole is heated while stirring strongly for 7 to 8 hours at 80–85°. A pale brown solution is obtained, the content of isomeric N.N′-bis-(2-hydroxycyclohexyl)-1.2-propylene diamine-N.N′-diacetic acids, determined titrimetrically, is 20.5%, which corresponds to a yield of 60.4% of the theoretical.

The solution of the sodium salt of diacetic acid obtained has similar properties to that obtained according to Example 8.

If in the above example, 61.3 parts of 2.3-butylene diamine-N.N′-diacetic acid or 69 parts of 1.2-diaminocyclohexane-N.N′-diacetic acid are used instead of 57 parts of 1.2-propylene diamine-N.N′-diacetic acid, and otherwise a procedure corresponding to that described in Example 9 is followed, then strongly complex forming aqueous solutions are also obtained.

What we claim is:

1. An amino acetic acid of the general formula:

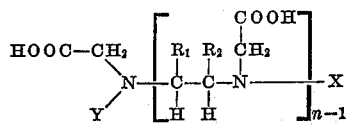

wherein X represents a member selected from the group consisting of lower β-hydroxyalkyl, 2-hydroxy cyclohexyl and lower α-carboxy alkyl groups, Y represents a 2-hydroxy cyclohexyl group, $R_1$ and $R_2$ each represent a member selected from the group consisting of hydrogen and lower alkyl groups, and $n$ represents a whole number from 1 to 3.

2. An amino acetic acid of the general formula:

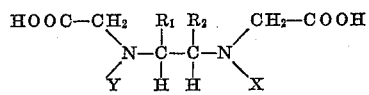

wherein X represents a member selected from the group consisting of lower β-hydroxyalkyl, 2-hydroxy cyclohexyl and lower α-carboxy alkyl groups, Y represents a 2-hydroxy cyclohexyl group, $R_1$ and $R_2$ each represent a member selected from the group consisting of hydrogen and lower alkyl groups.

3. An amino acetic acid of the formula:

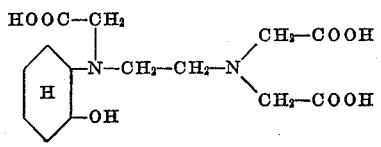

4. An amino acetic acid of the formula:
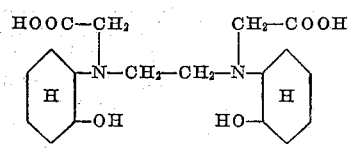
5. An amino acetic acid of the formula:
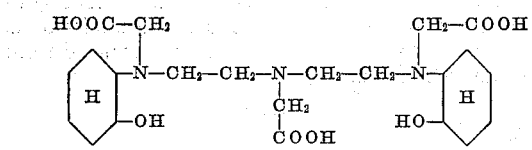
6. An amino acetic acid of the formula:
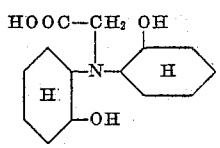
7. An amino acetic acid of the formula:
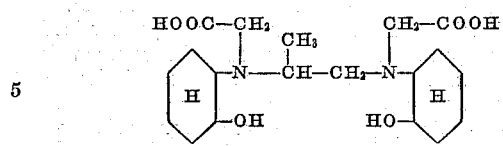
References Cited in the file of this patent
UNITED STATES PATENTS
| | | |
|---|---|---|
| 2,428,353 | Bersworth | Oct. 7, 1947 |
| 2,532,391 | Bersworth | Dec. 5, 1950 |
FOREIGN PATENTS
| | | |
|---|---|---|
| 719,901 | Great Britain | Dec. 8, 1954 |